(12) United States Patent
Grams et al.

(10) Patent No.: US 12,370,715 B2
(45) Date of Patent: Jul. 29, 2025

(54) DRIVE LINK FOR A SAWCHAIN, AND AN ARRANGEMENT OF A PLURALITY OF DRIVE LINKS FOR A SAWCHAIN

(71) Applicant: Andreas Stihl AG & Co. KG, Waiblingen (DE)

(72) Inventors: Tobias Grams, Waiblingen (DE); Juergen Maerz, Heubach-Lautern (DE); Wolfgang Kienzle, Remseck (DE); Maureen Wittig, Stuttgart (DE); Marius Freitag, Wil (CH); Marco Kewes, Jonschwil (CH)

(73) Assignee: Andreas Stihl AG & Co. KG, Waiblingen (DE)

( * ) Notice: Subject to any disclaimer, the term of this patent is extended or adjusted under 35 U.S.C. 154(b) by 345 days.

(21) Appl. No.: 17/898,083

(22) Filed: Aug. 29, 2022

(65) Prior Publication Data
US 2023/0061470 A1 Mar. 2, 2023

(30) Foreign Application Priority Data
Aug. 27, 2021 (EP) .................................. 21193482

(51) Int. Cl.
*B27B 33/14* (2006.01)
(52) U.S. Cl.
CPC .................................. *B27B 33/14* (2013.01)
(58) Field of Classification Search
CPC ........ B27B 33/14; B27B 33/141; B23D 65/00

USPC ............................................................ 83/830
See application file for complete search history.

(56) References Cited

U.S. PATENT DOCUMENTS

| 2,589,015 | A | | 3/1952 | Merz |
| 4,813,323 | A | | 3/1989 | Harst |
| 4,901,613 | A | * | 2/1990 | Carlton ................... B27B 33/14 83/831 |
| 2007/0089586 | A1 | * | 4/2007 | Harfst ................... B27B 33/142 83/830 |
| 2008/0072733 | A1 | | 3/2008 | Schulz et al. |
| 2017/0282398 | A1 | * | 10/2017 | Viscardi ................... B27B 33/14 |
| 2020/0180053 | A1 | * | 6/2020 | Torres Delgado .... B27B 33/141 |

FOREIGN PATENT DOCUMENTS

| EP | 0 304 256 A1 | | 2/1989 |
| EP | 0353359 A2 | * | 2/1989 |
| SU | 90819 A1 | | 11/1950 |

* cited by examiner

Primary Examiner — Nhat Chieu Q Do
(74) Attorney, Agent, or Firm — Walter Ottesen

(57) ABSTRACT

A drive link for a sawchain is disclosed wherein the drive link has a top side which faces away from an opening plane defined by the respective axes of the rivet openings and extends at least partially at the drive link apex. A functional surface and a contact surface spaced apart from the functional surface are provided on the top side of the drive link. The functional surface is formed on the drive link apex and includes a section of the top side in which the top side is at a maximum spacing from the opening plane. The functional surface of the top side of the drive link is point-symmetric to a symmetry point with respect to the contact surface in the viewing direction toward the drive link plane.

2 Claims, 2 Drawing Sheets

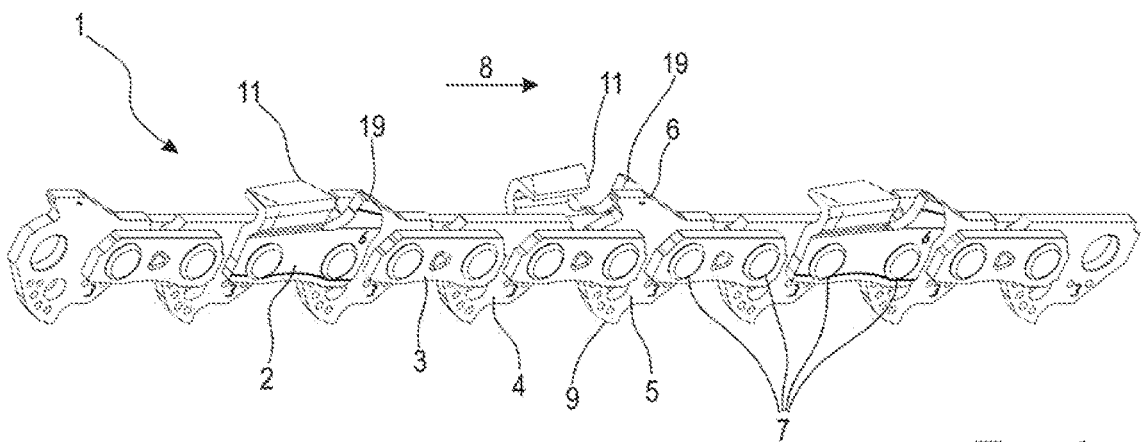
Fig. 1
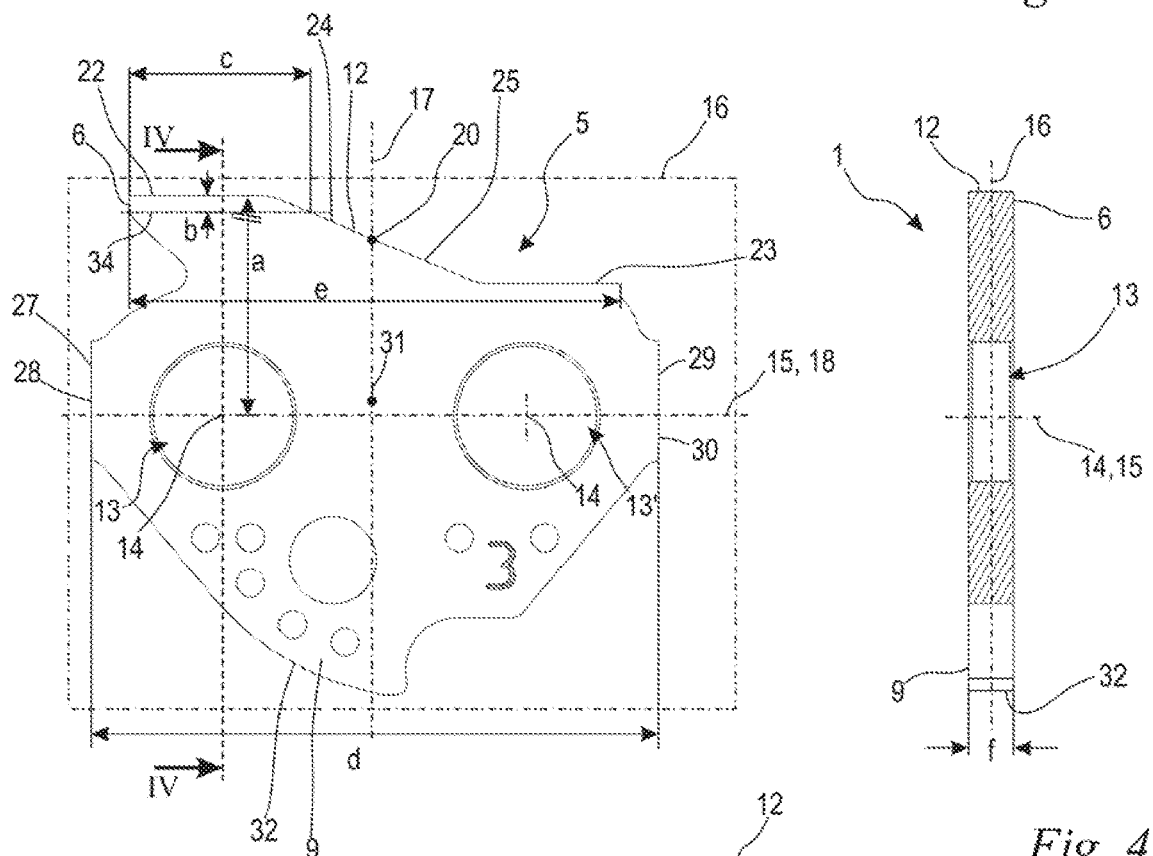
Fig. 2
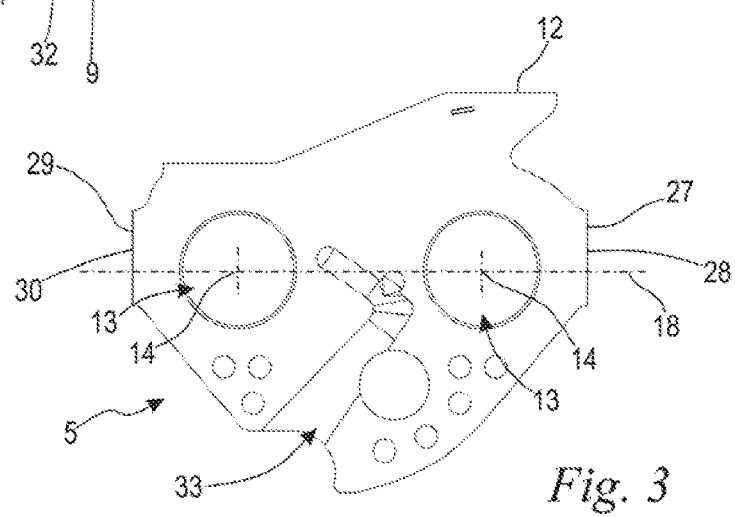
Fig. 3
Fig. 4

DRIVE LINK FOR A SAWCHAIN, AND AN ARRANGEMENT OF A PLURALITY OF DRIVE LINKS FOR A SAWCHAIN

CROSS REFERENCE TO RELATED APPLICATION

This application claims priority of European patent application no. 21193482.3, filed Aug. 27, 2021, the entire content of which is incorporated herein by reference.

TECHNICAL FIELD

The disclosure relates to a drive link for a sawchain and to an arrangement of a plurality of drive links for a sawchain.

BACKGROUND

A sawchain mounted on a work apparatus, for example on a chainsaw, serves to remove material from or machine a workpiece. A sawchain can be made up of a multiplicity of links, such as the drive links, the cutting links and the connecting links.

A drive link has, on its underside, a drive appendage, which, in the mounted state of the sawchain, engages in the groove in the guide bar. On the top of a drive link, a drive link apex can be provided. Such drive links are also known as apex drive links. A drive link with apexes is arranged in front of the cutting link in the running direction of the sawchain and serves to reinforce the depth delimiter of the cutting link. As a result, the sawchain exhibits particularly low kickback.

Such drive links are produced by punching. Sheet metal strips are guided through the punching tool, wherein the top part and bottom part continuously close and open and in the process the drive links are punched out of the sheet metal strips.

A drawback of known drive links is that, on account of their relatively large surface dimensions, in the production process an only low yield per sheet metal strip can be achieved.

SUMMARY

It is an object of the disclosure to provide a drive link, which allows cost-effective production of the drive link and of the sawchain.

In punching processes, as in other manufacturing processes, it is in principle always an aim to achieve a workpiece contour which corresponds to the target contour to be produced. In order to achieve this, an exact cut has to take place during punching. The concept of the disclosure is based on the finding that such an exact cut can be achieved when the contours to be punched out are spaced apart sufficiently from one another such that the material web that remains between the two contours provides sufficient resistance during cutting. Alternatively, an exact cut contour can be created when the contours of both workpieces are created with one cut. The following drive link allows a corresponding drive link arrangement in which the contours of both workpieces can be created with one cut.

The drive link for a sawchain has two openings for joint elements, a drive appendage and a drive link apex. The drive link is planar and extends in a drive link plane. The drive link has an opening plane, which contains the center axes of the openings and extends perpendicularly to the drive link plane. The drive link has a transverse plane, which extends perpendicularly to the opening plane and centrally between the center axes of the two openings. The drive link has a longitudinal axis, which extends in the drive link plane and intersects the center axes of the openings. The drive link apex is asymmetric with respect to the transverse plane. The drive link has a top, which faces away from the opening plane and extends at least partially at the drive link apex. A functional surface and a contact surface spaced apart from the functional surface are provided on the top of the drive link. The functional surface is formed on the drive link apex and comprises a section of the top in which the top side is at a maximum spacing from the opening plane. The functional surface of the top of the drive link is point-symmetric to a symmetry point with respect to the contact surface in the viewing direction toward the drive link plane.

The disclosure provides for the geometry of the drive links to be configured such that the punched contours of the drive links can be in contact with one another. As a result of the point-symmetric configuration of the functional surface and of the contact surface of a drive link, two drive links can be arranged with respect to one another such that the drive links are in contact with one another at their tops. In the process, the functional surface of one drive link is in contact with the contact surface of the other drive link. In addition, the contact surface of one drive link is in contact with the functional surface of the other drive link. As a result, the punched contours of the drive links are arranged compactly across the width of the sheet metal strip, with the result that the yield of manufactured drive links per sheet metal strip is increased and the production costs for the drive link can be lowered. As a result of the direct arrangement of the drive links with respect to one another, contours of both drive links can be created with one cut. Thus, in the production process of the drive links, low manufacturing tolerances can be maintained in spite of high piece numbers.

Advantageously, the functional surface of the top extends over a depth measured in a direction perpendicular to the opening plane, wherein the depth corresponds to at most 20%, in particular at most 10% of the maximum spacing between the functional surface and the opening plane. Accordingly, the functional surface is the section of the top of the drive link which is in contact with the bottom of the cut when cutting a material and serves as a depth delimiter for the cut.

Preferably, a length, measured in the direction of the longitudinal axis, of the functional surface is at least 15%, in particular at least 25% of a length, measured in the direction of the longitudinal axis, of the drive link.

Preferably, the top of the drive link has a first middle section and a second middle section, wherein the first middle section extends from the functional surface to the symmetry point and the second middle section extends from the symmetry point to the contact surface.

The first middle section and the second middle section are advantageously configured such that, in the case of an arrangement of two drive links with respect to one another, in which the tops of the drive links are in contact with one another and their symmetry points lie on top of one another, no spandrel is formed between the middle sections of the tops. In an alternative configuration of the drive link, the first middle section and the second middle section are configured in particular such that, in the case of an arrangement of two drive links with respect to one another, in which the tops of the drive links are in contact with one another and their symmetry points lie on top of one another, a spandrel is provided between the middle sections of the tops with a smallest radius (r) of at least 1.5 mm, preferably at least 1.65 mm. Preferably, the radius of the spandrel is at least 1.5 times as large as the sheet metal thickness or the width of the drive link. Thus, if the top is intended to have a symmetric section, the resultant spandrel should be provided with a corresponding minimum radius. In other words, the diameter of the spandrel is at least 3 mm. On account of the provided minimum size of the spandrel, the spandrel can be cut out exactly.

Advantageously, with respect to the second middle section, the first middle section is at least partially point-symmetric with regard to the symmetry point in the viewing direction toward the drive link plane. Preferably, with respect to the second middle section, the first middle section is fully point-symmetric with regard to the symmetry point in the viewing direction toward the drive link plane. If the top is fully symmetric, no spandrel arises when two drive links are arranged on their tops. This circumstance considerably simplifies the production process, since the spandrel does not have to be punched out in an upstream punching process. Preferably, the functional surface, the first center section, the second center section, and the contact surface form the top of the drive link.

Preferably, the top has a length measured in the direction of the longitudinal axis, wherein the length of the top corresponds to at least 65%, in particular at least 75%, preferably approximately 85% of the length of the drive link. With increasing length of the top, the waste between a plurality of drive links arranged with respect to one another or between the punched contours is reduced.

The symmetry point lies in the direction of the longitudinal axis preferably between the center axes of the openings, in particular between the openings, particularly advantageously centrally between the openings. The symmetry point is at a spacing from the transverse plane advantageously of less than 10%, in particular less than 5% of the length of the drive link. The more centrally the symmetry point is arranged with regard to the direction of the longitudinal axis, the more compactly the drive links can be arranged with respect to one another.

Advantageously, the drive link has, at one longitudinal end, a first end face and, at its other longitudinal end, a second end face, wherein the contours of the two end faces are identical in the viewing direction perpendicular to the drive link plane. Provision may also be made for the contours of the two end sides to be oriented parallel to one another in the viewing direction perpendicular to the drive link plane. It may furthermore be expedient for the contours of the two end faces to be identical in the viewing direction perpendicular to the drive link plane and to be oriented parallel to one another. In a particularly preferred embodiment, the end faces of a drive link are oriented parallel to the transverse plane. As a result of the configuration of the abovementioned features, an arrangement of two drive links or their punched contours is possible such that their end faces are at least partially, preferably fully in contact with one another. Thus, it is possible to arrange two drive links with respect to one another such that the first end face of one drive link and the second end face of the other drive link are in contact with one another and in the process form a single cut contour. As a result, a compact arrangement of the punched contours can also be achieved in the direction of the longitudinal axis of the drive links.

It is a further object of the disclosure to specify an arrangement of a plurality of drive links which allows cost-effective production of a sawchain.

Of course, the advantages already mentioned above in relation to the drive link according to the disclosure also apply to this arrangement. Furthermore, advantageously, the smallest radius of the central spandrel is at least 1.5 mm. In this way, low-tolerance production of the drive links is possible.

BRIEF DESCRIPTION OF THE DRAWINGS

The invention will now be described with reference to the drawings wherein:

FIG. 1 shows a perspective illustration of a detail of a sawchain for a chainsaw, having a drive link according to the disclosure;

FIG. 2 shows a side illustration of the drive link according to the disclosure;

FIG. 3 shows a rear illustration of the drive link according to FIG. 2;

FIG. 4 shows a sectional illustration of the drive link along the line IV in FIG. 2; and, FIG. 5 shows a side illustration of an arrangement of a plurality of drive links.

DESCRIPTION OF THE PREFERRED EMBODIMENTS

Figure 5:
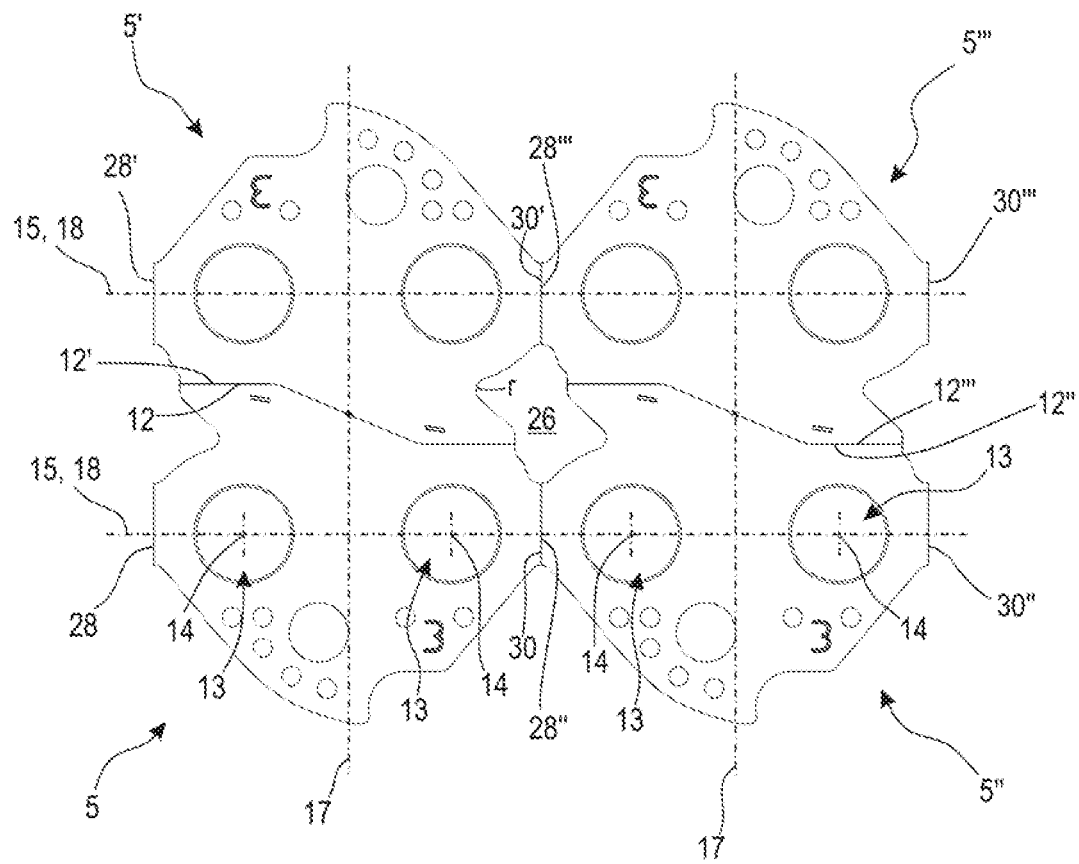

FIG. 1 shows a detail of a sawchain 1 for a work apparatus, in particular for a chainsaw. The sawchain 1 is constructed from cutting links 2, connecting links 3 and drive links 4, 5. The drive links 4, 5, cutting links 2 and connecting links 3 are connected together in an articulated manner via joint elements 7, in particular rivets. The sawchain 1 has a running direction 8, in which the sawchain 1 mounted on the chainsaw has to be moved in order to cut material to be cut, for example wood et cetera. The drive links 4, 5 are arranged centrally in the sawchain 1 and the connecting links 3 are provided at their outer sides. In the embodiment, each drive link 4, 5 has a drive appendage 9 for engaging in a drive member of a chainsaw. The drive links 4, 5 have a rear opening 13 and a front opening 13' with regard to the running direction 8 (FIG. 2). The rear opening 13 of a drive link 4, 5 is connected in each case to a front rivet opening of a connecting link 3, and the front opening 13' of a drive link 4, 5 is connected in each case to a rear rivet opening of a connecting link 3.

As seen in the running direction 8, every two connecting links 3, a cutting link 2 is arranged rather than a connecting link 3. The cutting links 2 are in this case provided alternately on a respective longitudinal side of the sawchain 1. The cutting links 2 have a cutting tooth 11, upstream of which a depth delimiter 19 is provided with regard to the running direction 8. The cutting tooth 11 serves to machine the cutting material to be cut. Provided next to the depth delimiter 19, on an adjacent drive link 5, is a drive link apex 6 for reinforcing the depth delimiter 19. An alternative structure of a sawchain 1 can also be provided.

FIG. 2 shows the drive link 5 with the drive link apex 6. The drive link 5 has two openings 13, 13', specifically a rear opening 13 and a front opening 13'. Furthermore, the drive link 5 includes the drive appendage 9, on which the bottom 32 of the drive link 5 at least partially extends. As shown in FIG. 4, a lubricant channel 33 is formed in the drive link 4, the lubricant channel 33 being connected to the openings 13, 13'. During operation of the sawchain 1, lubricant reaches the rivets 7 via the lubricant channel 33.

FIG. 4 shows a section view of the drive link 5 along the line IV-IV in the running direction 8. It is clearly apparent from the section view that the drive link 5 is planar. The drive link 5 extends in a drive link plane 16. As is apparent from FIGS. 2 and 4, the drive link 5 has an opening plane 15. The opening plane 15 contains the center axes 14 of the openings 13. The opening plane is oriented perpendicularly to the drive link plane 16.

As shown in FIG. 2, the drive link 5 has a transverse plane 17. The transverse plane 17 is oriented perpendicularly to the opening plane 15. The transverse plane 17 extends centrally between the center axes 14 of the two openings 13. Furthermore, the drive link 5 has a longitudinal axis 18, wherein the longitudinal axis 18 extends in the drive link plane 16 and intersects the center axes 14 of the openings 13. The drive link apex 6 is asymmetric to the transverse plane 17.

As shown in FIG. 2, the drive link 5 has a top 12 facing away from the opening plane 15. The bottom 32 of the drive link 5 in turn faces away from the top 12. The top 12 extends at least partially at the drive link apex 6.

Provided on the top 12 of the dive link 5 is a functional surface 22. The functional surface 22 is formed on the drive link apex 6. The functional surface 22 corresponds to the section of the top 12 of the drive link 5 that cooperates functionally with the bottom of the cut when a material is being cut, that is, is in contact therewith and thus serves as a depth delimiter for the cut. The functional surface 22 accordingly includes a section of the surface in which the top 12 is at a maximum spacing a from the opening plane 15. Furthermore, the functional surface 22 of the top 12 extends over a depth b measured in a direction perpendicular to the opening plane 15. The depth b corresponds to at most 20%, in particular at most 10% of the maximum spacing a between the functional surface 22 and the opening plane 15. The cutting process is a highly dynamic process, and so it should be assumed that the drive link 5 is in contact with the material to be cut not only at the "highest point" of its drive link apex 6 but there are operative connections at regions adjacent to the "highest point" too. This region is schematically indicated by a reference line 34 which corresponds to the depth b of the functional surface 22. Furthermore, the functional surface 22 has a length c measured in the direction of the longitudinal axis 18, wherein the length c of the functional surface 22 is at least 15%, in particular at least 25% of a length d, measured in the direction of the longitudinal axis 18, of the drive link 5.

As shown in FIG. 2, a contact surface 23 is provided on the top 12. The contact surface 23 is formed on the top 12 at a spacing from the functional surface 22. The functional surface 22 of the top 12 of the drive link 5 is point-symmetric to a symmetry point 20 with respect to the contact surface 23 in the viewing direction toward the drive link plane 16. The symmetry point 20 lies, in the preferred embodiment, on the top 12 of the drive link 5. This at least partially symmetric configuration of the top 12 allows, as shown in FIG. 5, an arrangement of two structurally identical drive links 5, 5' such that, in the embodiment, their tops 12 are in contact fully at the functional surface 22 and the contact surface 23, in particular over their entire top 12, that is, also at the middle sections 24, 25, in particular continuously. In the embodiment, the frontmost and rearmost points of the top 12, 12' of one and of the other drive link 5, 5' bear on one another. In an alternative embodiment, it may be expedient for the top 12 of the drive link 5 to be configured such that, in an arrangement, the tops 12 of two drive links 5, 5' are in contact only over a part of the functional surface 22 and the contact surface 23 of the other drive link 5'.

As shown in FIG. 2, the top 12 of the drive link 5 has a first middle section 24 and a second middle section 25. The first middle section 24 extends from the function surface 22 to the symmetry point 20. The second middle section 25 extends from the symmetry point 20 to the contact surface 23. In the embodiment, the functional surface 22, the first middle section 24, the second middle section 25, and the contact surface 23 form the top 12 of the drive link 5. The top 12 has in this case a length e measured in the direction of the longitudinal axis 18, wherein the length e corresponds to at least 65%, in particular at least 75%, preferably approximately 85% of the length d of the drive link 5. In the embodiment, the contours of the first middle section 24 and of the second middle section 25 jointly form, in the viewing direction toward the drive link plane 16, a connecting straight line between the functional surface 22 and the contact surface 23. The connecting straight line intersects the symmetry point 20. Accordingly, in the embodiment, the first middle section 24 and the second middle section 25 are formed fully point-symmetrically with regard to the symmetry point 20 likewise in the viewing direction toward the drive link plane 16. Accordingly, in an arrangement of two structurally identical drive links 5, which bear mutually against their tops 12 and have no spandrel between the tops 12, arises (FIG. 5).

In an alternative embodiment, likewise according to the disclosure, of the drive link, provision may be made for the first middle section 24, with respect to the second middle section 25, to be formed only partially point-symmetrically with regard to the symmetry point 20 in the viewing direction toward the drive link plane 16. Accordingly, the two middle sections 24, 25 would be formed at least partially asymmetrically. This has the result that, in an arrangement of two structurally identical drive links 5 in which the tops 12 of the drive links 5 are in contact and their symmetry points 20 lie on one another, the tops 12 of the drive links 5 are only partially in contact. Accordingly, there is a spandrel between the tops 12 of the drive links 5 in the region of the middle sections 24, 25. In order nevertheless for it to be possible to realize a compact arrangement of the drive links, the spandrel needs to be producible. Accordingly, the middle sections 24, 25 are formed such that the smallest radius r is at least 1.5 mm. The smallest radius r is in particular at least 1.5 times the width f of the drive link 5. The width f of the drive link 5 is measured perpendicularly to the drive link plane 16.

As shown in FIG. 2, the symmetry point 20 lies in the direction of the longitudinal axis 18 between the center axes 14 of the openings 13, 13'. In the preferred embodiment, the symmetry point 20 lies between the openings 13, 13' of the drive link 5. The symmetry point 20 is at a spacing from the transverse plane 17 of less than 10%, in particular less than 5% of the length d of the drive link 5. In the preferred embodiment, the symmetry point 20 lies in the transverse plane 17.

As shown in FIGS. 2 and 4, the drive link 5 extends along its longitudinal axis 18 from one longitudinal end 27 to its other longitudinal end 29. The drive link 5 has, at one longitudinal end 27, a first end face 28 and, at its other longitudinal end 29, a second end face 30. In the preferred embodiment, the end faces 28, 30 are oriented parallel to one another. In addition, the end faces 28, 30 are oriented parallel to the transverse plane 17. This allows, as shown in FIG. 5, an arrangement of two structurally identical drive links 5, 5" such that the end faces 28, 28", 30, 30" are in contact and cover one another at least partially, but preferably fully. In the arrangement according to FIG. 5, the drive links 5, 5" are arranged in the longitudinal direction 18 such that the second end face 30 of one drive link 5 is in contact with the first end face 28" of the other drive link 5".

In an alternative embodiment of the drive link 5, the end faces 28, 30 can also have other contours, in particular a curved contour. In order that an arrangement of drive links 5 is still possible such that their end faces are in contact and substantially overlap, the second end face 30 of the drive link 5 is shifted in parallel with regard to the first end face 28 of the drive link 5. The parallel shift occurs preferably along the longitudinal axis 18 of the drive link 5.

As shown in FIGS. 2 and 4, the functional surface 22 and thus also the contact surface 23 are formed parallel to the opening plane 15. Furthermore, the functional surface 22 and the contact surface 23 could, in an alternative embodiment, be shaped differently. The top 12 could, for example, have an S-shaped contour. Thus, contours are possible which form the at least partial point symmetry between the functional surface 22 and the contact surface 23.

As shown in FIG. 5, four structurally identical drive links 5, 5', 5", 5'" are arranged with respect to one another. In each case two drive links 5, 5', 5", 5'" are in contact with one another at their tops 12, 12', 12", 12'" and in each case two drive links 5, 5', 5", 5'" are in contact with one another at their end faces 30, 28", 30', 28'". In this case, the drive links 5, 5', 5", 5'" enclose a central spandrel 26 with their contours between the top sides 12, 12', 12", 12'" and the end faces 30, 28", 30', 28'". The contours are configured such that the smallest radius r of the central spandrel 26 is at least 1.5 mm. The smallest radius r of the central spandrel 26 is also preferably 1.5 times the width f of the drive link 5.

It is understood that the foregoing description is that of the preferred embodiments of the invention and that various changes and modifications may be made thereto without departing from the spirit and scope of the invention as defined in the appended claims.

What is claimed is:

1. A drive link for a sawchain, the drive link comprising:
a drive link body defining two openings for joint elements and having a drive link apex and a drive appendage defining a bottom side configured to engage in a groove of a guide bar;
said drive link body being planar and extending in a drive link plane;
said two openings each defining a center axis;
said drive link body defining an opening plane containing said center axes of said two openings and extending perpendicularly to said drive link plane;
said drive link body defining a transverse plane extending perpendicular to said opening plane and centrally between said center axes of said two openings;
said drive link body defining a longitudinal axis extending in said drive link plane and intersecting said center axes of said two openings;
said drive link apex being asymmetrical with respect to said transverse plane;
said drive link body having a top side facing away from said bottom side and said opening plane and extending at least partially at said drive link apex;
said drive link body having a functional surface and a contact surface spaced apart from said functional surface at said top side by a linear connecting surface;
said functional surface and said contact surface defining respective first and second planes parallel to each other;
said functional surface being formed on said drive link apex and including a section of said top side in which said top side has a maximum spacing from said opening plane; and,
said functional surface, with respect to said contact surface in a viewing direction toward said drive link plane, being configured point-symmetric to a symmetry point lying between said first and second planes and in spaced relationship to said functional surface and said contact surface.

2. The drive link of claim 1, wherein the top side of the drive link has a first middle section and a second middle section; and, said first middle section extends from said functional surface to said symmetry point and said second middle section extends from said symmetry point to said contact surface.

* * * * *